United States Patent
Kim (10) Patent No.: US 9,830,639 B2
(45) Date of Patent: Nov. 28, 2017

(54) PRODUCT ORDER SERVICE SYSTEM IN THE ELECTRONIC COMMERCE USING SMART PHONE AND METHOD THEREOF

(71) Applicant: EBAY KOREA CO., LTD., Seoul (KR)

(72) Inventor: Phil Jae Kim, Seoul (KR)

(73) Assignee: eBay Korea Co., Ltd, Seoul (KR)

( * ) Notice: Subject to any disclaimer, the term of this patent is extended or adjusted under 35 U.S.C. 154(b) by 343 days.

(21) Appl. No.: 14/549,606

(22) Filed: Nov. 21, 2014

(65) Prior Publication Data

US 2015/0161713 A1    Jun. 11, 2015

(30) Foreign Application Priority Data

Nov. 21, 2013    (KR) .......................... 10-2013-0142166

(51) Int. Cl.
G06Q 30/00    (2012.01)
G06Q 30/06    (2012.01)
G06Q 20/32    (2012.01)
G06Q 20/20    (2012.01)

(52) U.S. Cl.
CPC ....... *G06Q 30/0633* (2013.01); *G06Q 20/202* (2013.01); *G06Q 20/322* (2013.01)

(58) Field of Classification Search
None
See application file for complete search history.

(56) References Cited

U.S. PATENT DOCUMENTS

| 2009/0160735 A1* | 6/2009 | Mack | G06Q 30/02 345/2.3 |
| 2011/0270662 A1* | 11/2011 | Rocco | G06Q 30/02 705/14.27 |
| 2014/0089061 A1* | 3/2014 | Vitale | G06Q 20/3274 705/7.41 |
| 2014/0279294 A1* | 9/2014 | Field-Darragh | G06Q 10/087 705/28 |

FOREIGN PATENT DOCUMENTS

| KR | 1020010016436 A | 3/2001 |
| KR | 20100030218 A | 3/2010 |

(Continued)

OTHER PUBLICATIONS

"Korean Application Serial No. 10-2013-0142166, Decision of Final Rejection dated Nov. 26, 2015", with English translation of claims, 6 pgs.

(Continued)

*Primary Examiner* — Courtney Stopp
(74) *Attorney, Agent, or Firm* — Schwegman Lundberg & Woessner, P.A.

(57) ABSTRACT

Disclosed are a system and method for providing a product order service in an electronic transaction. With the system and method, it is possible to conveniently order an online/offline product through an electronic transaction and also make and distribute a simple app for a small retail shop such as a fried chicken shop, by transmitting purchaser information required for an order to the partner company server in addition to payment-related information about purchase of the specific product or cooperating with a partner-company-related application service.

10 Claims, 3 Drawing Sheets

(56) References Cited

FOREIGN PATENT DOCUMENTS

| KR | 20100050121 A | 5/2010 |
|----|---------------|--------|
| KR | 20100050816 A | 5/2010 |

OTHER PUBLICATIONS

"Korean Application Serial No. 10-2013-0142166, Decision to Grant dated Feb. 25, 2016", with translation, 3 pgs.
"Korean Application Serial No. 10-2013-0142166, Office Action dated Apr. 20, 2015", with English translation of claims, 7 pgs.
"Korean application serial No. 10-2013-0142166, Request for Re-examination filed Jan. 26, 2016", with machine translation, 28 pgs.
"Korean Application Serial No. 10-2013-0142166, Response filed Jul. 17, 2015", with machine translation, 24 pgs.

* cited by examiner

PRODUCT ORDER SERVICE SYSTEM IN THE ELECTRONIC COMMERCE USING SMART PHONE AND METHOD THEREOF

CLAIM FOR PRIORITY

This application claims priority to Korean Patent Application No. 2013-0142166 filed on Nov. 21, 2013 in the Korean Intellectual Property Office (KIPO), the entire contents of which are hereby incorporated by reference.

BACKGROUND

1. Technical Field

Example embodiments of the present invention relate in general to a system and method for providing a product order service through an electronic transaction using a smartphone, and more specifically to a system and method for providing a product order service through an electronic transaction using a smartphone such that an online/offline product may be conveniently ordered through the electronic transaction using a shopping-mall-related application service and a partner-company-related application service installed in the smartphone.

2. Related Art

Recently, along with the rapid development of the Internet, electronic transactions, in which products are purchased on-line, increase day by day. Electronic transactions are being increasingly applied to various products including daily necessities, housewares, and electronics.

Such development of electronic transactions has been a result of the development of communication networks as well as the provision of other benefits that cannot be obtained by sellers and purchasers through traditional transaction systems.

That is, advantageously, sellers need not maintain a shop or a separate large warehouse for storing products, and thereby saving funds on facilities and can reflect this in product prices, while the purchasers may shop conveniently and at lower prices without needing to visit a shop.

That is, an electronic transaction is the sale or purchase of goods or services, a portion or all of which is electronically processed, for example, through an exchange of electronic documents.

Similarly to transactions made in the real world, all participants in the transaction participate in the electronic transaction. In the simplest electronic transaction, the participants in the electronic transaction include a cyber mall that provides goods or services, a consumer that purchases goods or services from the cyber mall, and a virtual bank or a credit card company that handles any money transactions for products.

In a process of the electronic transaction, first, a consumer accesses a cyber mall using a terminal connected to the Internet, such as a computer, and then shops. The consumer finds a desired product, delivers a purchase decision to the cyber mall, and provides a payment means such as a credit card number or a password.

The cyber mall verifies the credit card number and password that are presented by the customer with the virtual bank or the credit card company, and requests payment of the purchase price. When the virtual bank or credit card company gives the payment to the cyber mall, the cyber mall delivers the product to the customer, thereby completing the purchase process.

Such electronic transaction shopping malls on the Internet introduce a variety of products and enable the products to be directly ordered on the Internet, thereby simplifying consumers' lives.

However, there are temporal and spatial limitations in that the consumer should find a place at which a computer is positioned, access the Internet using the computer, and place an order by entering his/her personal information and payment information into the computer, or can place an order by telephone, but only during working hours of representatives.

Accordingly, a smartphone solves the above problems by allowing a user to place an order anywhere at any time, without the temporal and spatial limitations. Thus, there is a need to develop an order system that is novel and involves an inventive step, which may allow a consumer to place an order more conveniently and simply and allow a seller to save labor costs on representatives or operating costs on a cyber mall and sell product to consumers at more reasonable prices.

Conventionally, when an online/offline product is ordered using a smartphone, respective applications (for example, an Auction app and a Pizza Hut app) are separately executed to make a purchase (for example, using the Auction app) and to make an order (for example, using the Pizza Hut app), thereby causing inconvenience to the user.

For example, when a product is purchased using a partner company app (for example, the Pizza Hut app), a purchaser purchases a product to which a discount coupon is applied through an open market app (for example, the Auction app) using his/her smartphone and then executes the partner company app to place the order by entering a serial number of the coupon and delivery destination information.

However, when the above process is performed, the user should make a payment through the open market app, remember the coupon number, and enter some personal information in the partner company app. This procedure is too cumbersome.

SUMMARY

Accordingly, example embodiments of the present invention are provided to substantially obviate one or more problems due to limitations and disadvantages of the related art.

Example embodiments of the present invention provide a system and method for providing a product order service through an electronic transaction using a smartphone such that an online/offline product may be conveniently ordered through the electronic transaction using a shopping-mall-related application service and a partner-company-related application service installed in the smartphone.

In some example embodiments, a system for providing a product order service through an electronic transaction using a smartphone includes: a smartphone configured to perform a shopping-mall-related application service; a shopping mall server provided to purchase a specific product having a unique product number registered through a partner company; and a partner company server configured to register the specific product having the unique product number with the shopping mall server, wherein, when the specific product having the unique product number registered through the partner company is purchased and paid for using the shopping-mall-related application service installed in the smartphone, the shopping mall server transmits purchaser information required for an order to the partner company server in addition to payment-related information about purchase of the specific product, and the partner company server receives an order for the specific product and performs a delivery processing service based on the payment-related information and the purchaser information required for the order that are transmitted from the shopping mall server.

Upon receiving the payment-related information and the purchaser information required for the order that are transmitted from the shopping mall server, the partner company server may provide a service for displaying a purchase completion message for checking purchase completion for a specific product purchased by a purchaser through a partner-company-related application service installed in the smartphone.

The unique product number may include at least any one of a partner-company-related application unique number, a product code, an order option code, and a discount information code.

The purchaser information required for the order may be previously stored in a purchaser information database (DB) of the shopping mall server and may include a delivery destination address, a recipient, and a contact.

Upon receiving the payment-related information and the purchaser information required for the order that are transmitted from the shopping mall server, the partner company server may transmit a product purchase confirmation message to the smartphone.

When the shopping mall server transmits purchaser information required for an order of a paid specific product to the partner company server, the purchaser information required for an order of a specific product paid through a shopping-mall-related application service installed in a smartphone of a purchaser may be entered into a partner-company-related application service installed in the smartphone of the purchaser automatically and then may be transmitted to the partner company server through the partner-company-related application service.

In other example embodiments, a method of providing a product order service through an electronic transaction using a system including a smartphone connected with a shopping mall server and a partner company server over a communication network includes steps of: (a) registering a specific product having a unique product number with the shopping mall through the partner company server; (b) purchasing and paying for the specific product having the unique product number registered in step (a) using a shopping-mall-related application service installed in the smartphone; (c) transmitting payment-related information about the specific product purchased in step (b) and purchaser information required for an order to the partner company server through the shopping mall server; and (d) receiving the order for the specific product and performing a delivery processing service based on the payment-related information and the purchaser information required for the order that are transmitted in step (c) through the partner company server.

In step (d), upon receiving the payment-related information and the purchaser information required for the order that are transmitted in step (c), the partner company server may provide a service for displaying a purchase completion message for checking purchase completion for a specific product purchased by the purchaser through a partner-company-related application service installed in the smartphone.

In step (a), the unique product number may include at least any one of a partner-company-related application unique number, a product code, an order option code, and a discount information code.

In step (c), the purchaser information required for the order may be previously stored in a purchaser information database (DB) of the shopping mall server and include a delivery destination address, a recipient, and a contact.

In step (c), when the shopping mall server transmits purchaser information required for an order of a paid specific product to the partner company server, the purchaser information required for an order of a specific product paid through a shopping-mall-related application service installed in a smartphone of a purchaser may be automatically entered into a partner-company-related application service installed in the smartphone of the purchaser and then may be transmitted to the partner company server through the partner-company-related application service.

In step (d), upon receiving the payment-related information and the purchaser information required for the order that are transmitted in step (c), the partner company server may transmit a product purchase confirmation message to the smartphone.

In still other example embodiments, a readable medium records a program for executing the method of providing the product order service through the electronic transaction using the smartphone.

The method of providing the product order service through the electronic transaction using the smartphone can also be implemented as computer-readable codes on a computer-readable recording medium. The computer-readable recording medium includes all kinds of recording device for storing data which can be thereafter read by a computer system.

Examples of the computer-readable recording medium include a read-only memory (ROM), a random-access memory (RAM), a CD-ROM, a magnetic tape, a hard disk, a floppy disk, a mobile storage device, a non-volatile memory (flash memory), and an optical data storage device.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

As used herein, the term "and/or" includes any and all combinations of one or more of the associated listed items.

It will be understood that, although the terms first, second etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of example embodiments The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein In the following description, when the detailed description of relevant known functions or configurations is determined to unnecessarily obscure the important point of the present invention, the detailed description will be omitted. Also, the terms described below are defined in consideration of the functions in the present invention, and thus may vary depending on intentions or customs of a user or operator. Accordingly, the terms will be defined based on the whole specification.

Figure 1:
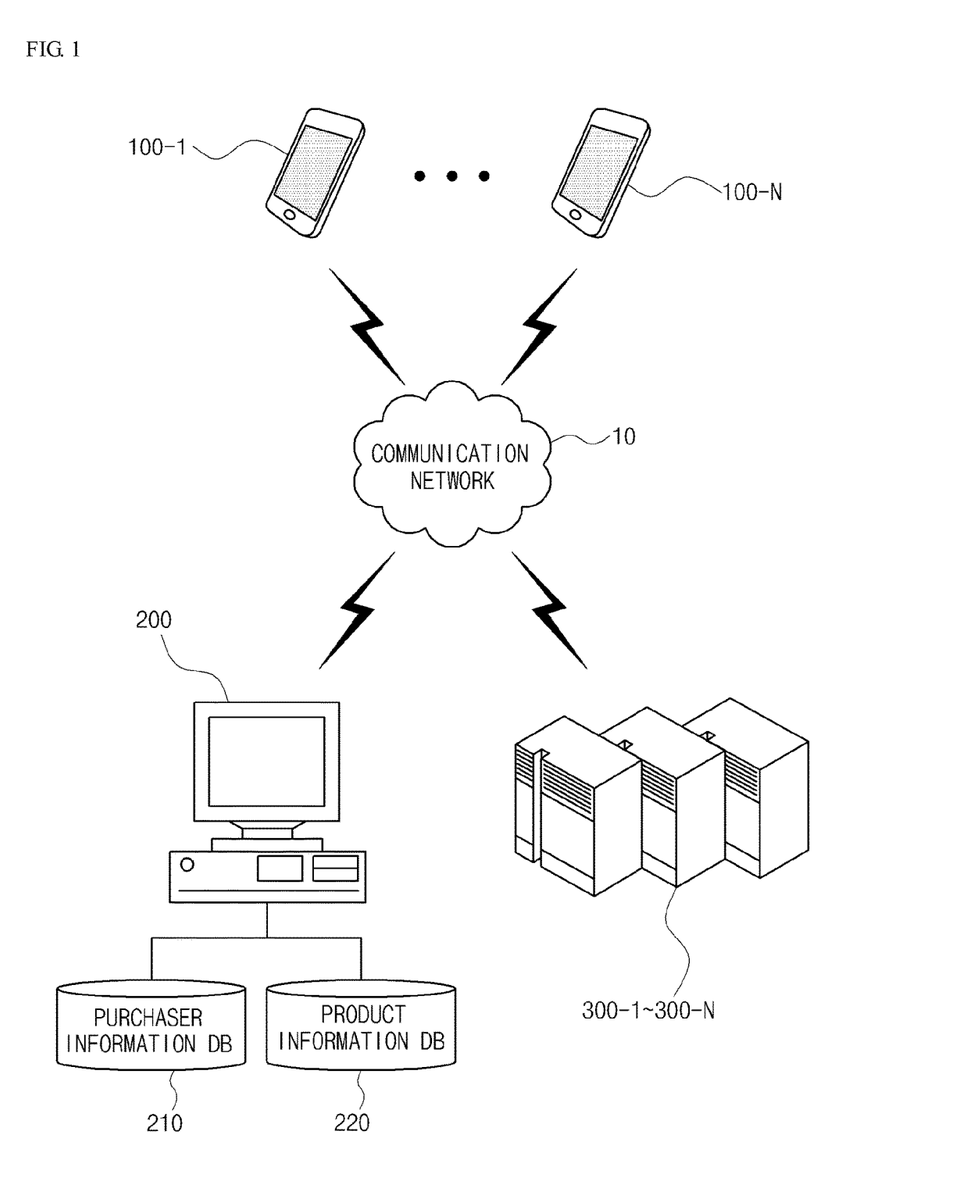
FIG. 1 is a block diagram illustrating a system for providing a product order service through an electronic transaction using a smartphone according to an embodiment of the present invention.

FIG. 1 is a block diagram illustrating a system for providing a product order service through an electronic transaction using a smartphone according to an embodiment of the present invention.

Referring to FIG. 1, a system for providing a product order service through an electronic transaction using a smartphone according to an embodiment of the present invention largely includes smartphones 100-1 to 100-N, a shopping mall server 200, and partner company servers 300-1 to 300-N.

Here, it will be understood that each of the smartphones 100-1 to 100-N is an open-operating-system-based phone in which a user may freely download, use, and delete a variety of desired application programs, unlike a general cell phone (namely, a feature phone), and may be a communication device including a mobile phone having a mobile office function in addition to functions such as voice/video calls, Internet data communication, etc. or any Internet phone or tablet PC which can access the Internet but does not have a voice call function.

The smartphone 100-1 to 100-N may be implemented as a smartphone with an open operating system. Examples of the open operating system include Nokia's Symbian, RIM's BlackBerry, Apple's iOS, Microsoft's Windows Mobile, Google's Android, and Samsung's Bada.

Accordingly, since the smartphone 100-1 to 100-N uses an open operating system unlike a cellular phone having a closed operating system, a user may install and manage various application programs.

That is, the above-described smartphone 100-1 to 100-N basically includes a control unit, a memory unit, a screen output unit, a key input unit, a sound output unit, a camera unit, a wireless network communication module, a short-distance wireless communication module, and a battery for supplying power.

The control unit is a functional element for controlling an operation of the smartphone 100-1 to 100-N, and includes at least one process and an execution memory, which are connected with each functional element included in the smartphone 100-1 to 100-N through a bus.

The control unit controls an operation of the smartphone 100-1 to 100-N by loading at least one program code included in the smartphone 100-1 to 100-N to the execution memory through the processor, performing calculation, and delivering a result of the calculation to at least one functional element through the bus.

The memory unit is a non-volatile memory included in the smartphone 100-1 to 100-N, and stores at least one program code that is executed through the control unit and at least one data set that is used by the program code. Basically, the memory unit stores a system program code and a system data set that correspond to an operating system of the smartphone 100-1 to 100-N, a communication program code and a communication data set that process a wireless communication connection of the smartphone 101-1 to 100-N, and at least one application program code and application data set. The program code and the data set that are used to implement the present invention are also stored in the memory unit.

The screen output unit includes a screen output device (for example, a liquid crystal display (LCD) device) and an output module for driving the screen output device and is connected with the control unit through the bus to output a calculation result corresponding to a screen output among various calculation results of the control unit to the screen output device.

The key input unit includes a key input device (or a touch screen device that interoperates with the screen output unit) having at least one key button and an input module for driving the key input device and is connected with the control unit through the bus to input commands for instructing various calculations of the control unit or data that is needed for the operations of the control unit.

The sound output unit includes a speaker for outputting a sound signal and a sound module for driving the speaker and is connected with the control unit through the bus to output a calculation result corresponding to a sound output among various calculation results of the control unit through the speaker. The sound module decodes sound data to be output through the speaker, and converts the decoded sound data into a sound signal.

The sound input unit includes a microphone for receiving a sound signal and a sound module for driving the microphone and delivers sound data that is input through the microphone to the control unit. The sound module encodes a sound signal that is input through the microphone.

The camera unit includes an optical unit, a charge coupled device (CCD), and a camera module for driving the CCD, and acquires bitmap data that is input to the CCD through the optical unit. The bitmap data may include both of still image data and moving image data.

The wireless network communication module is a communication element for connecting wireless communication, includes at least one of an antenna, an RF module, a baseband module, and a signal processing module, and is connected with the control unit through the bus to transmit a calculation result corresponding to the wireless communication among the various calculation results of the control unit, or maintain access, registration, communication, and handoff procedures of the wireless communication while receiving data through the wireless communication to transmit the received data to the control unit.

In addition, the wireless network communication module includes a mobile communication element that performs at least one of access to a mobile communication network, position registration, call processing, call connection, data communication, and a handoff according to code division multiple access (CDMA)/wideband code division multiple access (WCDMA) standards. It will be understood by a person skilled in the art that the wireless network communication module may further include a mobile Internet communication element for performing at least one of the access to mobile Internet, the position registration, the data communication, and the handoff according to IEEE 802.16 standards. However, it is apparent that the present invention is not limited to wireless communication elements that are provided by the wireless network.

The short-distance wireless communication module is configured to establish a communication session using a radio frequency signal within a certain distance as a communication medium, and may include at least one of RFID communication, Bluetooth communication, Wireless Fidelity (Wi-Fi) communication, and public radio communication in ISO 180000 series standards. In addition, the short-distance wireless communication module may be integrated with the wireless network communication module.

The smartphone 100-1 to 100-N having the above-described configuration is a terminal capable of wireless communications. Any device other than the smartphone may be applied as long as the device is a terminal that may transmit and/or receive data over a network including the Internet. That is, the smartphone 100-1 to 100-N may include at least one of a notebook PC, a tablet PC, and other portable and mobile terminals, which have a short message sending function and a network access function.

In particular, the smartphone 100-1 to 100-N according to an embodiment of the present invention downloads a shopping-mall-related application (for example, an Auction app) and a partner-company-related application (for example, a fashion company app, a delivery company app for pizza or fried chicken, a mart app, etc.) through an app store and performs a respective shopping-mall-related application service and partner-company-related application service.

In addition, the smartphone 100-1 to 100-N is connected with an online shopping mall server 200 and a partner company server 300-1 to 300-N over a communication network 10. The communication network 10 is a large high-speed backbone communication network that may provide a large-scale long-distance voice and data service, and may be a next-generation wireless network, including WiFi, Wibro, Wimax, and so on, for providing the Internet or a high-speed multimedia service.

In this case, the Internet refers to an open global computer network structure that can provide several services in the TCP/IP protocol and its upper layer, that is, hypertext transfer protocol (HTTP), Telnet, file transfer protocol (FTP), domain name system (DNS), simple mail transfer protocol (SMTP), simple network management protocol (SNMP), network file service (NFS), network information service (NIS), and so on, and provides an environment in which any purchasers and sellers of the smartphone 100-1 to 100-N may access the online shopping mall server 200 and partner company server 300-1 to 300-N. The Internet may be a wired or wireless network, and a core network that is integrated with a wired public network, a wireless mobile communication network, or a portable Internet network.

If the communication network 10 is a mobile communication network, the communication network 10 may be a synchronous mobile communication network or asynchronous mobile communication network. Examples of the asynchronous mobile communication network may include a WCDMA communication network. Although not shown, the mobile communication network may include a radio network controller (RNC). Alternatively, examples of the asynchronous mobile communication network may include a next-generation communication network such as a 3G Long Term Evolution (LTE) network and a 4G network, or an Internet protocol (IP) network based on an IP, instead of the WCDMA network. The communication network 10 serves to transfer signals and data between the smartphone 100-1 to 100-N, and the online shopping mall server 200 and the partner company server 300-1 to 300-N.

In addition, the smartphone 100-1 to 100-N may access the online shopping mall server 200 through the communication network 10 and use a transaction relay service for various products or services of the online shopping mall server 200 according to processing of wired/wireless communication by a communication interface. A purchaser may join the online shopping mall server 200 as a member through his/her smartphone 100-1 to 100-n. Purchaser information that is registered by the purchaser who has joined may be stored in the purchaser information database (DB) 210 of the online shopping mall server 200.

Furthermore, the online shopping mall server 200 functions to provide a service for purchasing a specific product having a unique product number that is registered through the partner company using the shopping-mall-related application service that is installed in the smartphone 100-1 to 100-N.

In this case, the unique product number may include, for example, at least any one of a unique partner-company-related application number, a product code, an order option code, and a discount information code.

In particular, when the purchaser purchases and pays for the specific product having the unique product number registered through the partner company using the shopping-mall-related application service installed in his/her smartphone 100-1 to 100-N, the online shopping mall server 200 functions to transmit purchaser information required for an order to the partner company server 300-1 to 300-N in addition to payment-related information about purchase of the specific product.

In this case, the purchaser information required for the order may be previously stored in a purchaser information DB 210 and include a delivery destination address, a recipient, and contact information.

The online shopping mall server 200, which is a server for operating an online shopping mall over the communication network 10 to relay a product transaction between the partner company and the purchaser, manages a web page needed to operate the shopping mall such that registration of various products that the seller intends to sell may be accepted by the partner company server 300-1 to 300-N over the communication network 10 and the various registered products may be provided to the smartphone 100-1 to 100-N through a web server (not shown) connected to the communication network 10, allowing the purchaser to purchase a necessary product.

Alternatively, the online shopping mall server 200 may basically manage the web page such that payment for the product that is selected by the purchaser from among a list of the sale products may be processed, a process required for delivery, such as notification of guidance about the paid product to the seller, may be performed to deliver the paid product to the purchaser, and delivery of the product in transit may be tracked.

The online shopping mall server 200, which is a server for operating an online shopping mall through the communication network 10 to relay a general transaction, an auction, a reverse auction, and bargaining of a product or service between a seller and a purchaser, accepts registration of various products or services that the seller intends to sell from the partner company server 300-1 to 300-N through the communication network 10 and provides the various registered products or services to the smartphone 100-1 to 100-N through the communication network 10, thus allowing the purchaser to purchase a necessary product or service.

A web server of the online shopping mall server 200 functions to connect the online shopping mall server 200 with the smartphone 100-1 to 100-N of the purchaser and the partner company server 300-1 to 300N through the communication network 10 and provide a variety of web services of the online shopping mall server 200 through a specific web page.

The purchaser information DB 210 included in the online shopping mall server 200 is a DB for recording and managing purchaser information, for example, a purchaser ID, a password, contact information, cart information, product information about a product being bid on, product information about a product for which bidding has concluded, product information about a bargained product, product information about a paid product, delivery information, purchase decision information, product information of a favorite shop, and so on, which is registered by the joined purchaser and which may be read or updated to new purchaser information by the online shopping mall server 200.

In addition, the product information DB 220 included in the online shopping mall server 200 is a DB for recording information about various sale products, which may be read or updated to new sale product information by the online shopping mall server 200.

The above-described DBs 210 and 220 may be implemented for the purpose of the present invention using a relational database management system (RDBMS), such as Oracle, Infomix, Sybase, and DB2, and an object-oriented database management system (OODBMS), such as Gemstone, Orion, and O2, and configured to have a field suitable for accomplishing its function.

In addition, in this specification, the term DB may mean a functional and structural combination of hardware and software, which stores information corresponding to respective databases. The DB may be implemented as at least one table and further include a separate database management system (DBMS) for retrieving, storing, and managing information that is stored in a database.

In addition, the DB may be implemented in various manners such as a linked-list, a Tree, and a relational database, and includes all data storage media and data structures that may store information corresponding to the database.

The partner company server 300-1 to 300-N functions to register a specific product having a unique product number with the online shopping mall server 200.

Moreover, the partner company server 300-1 to 300-N functions to accept an order for a specific product and perform a delivery service based on the payment-related information and the purchaser information required for the order that are transmitted from the shopping mall server 200.

Upon receiving the payment-related information and the purchaser information required for the order that are transmitted from the shopping mall server, the partner company server 300-1 to 300-N may provide a service for displaying a purchase completion message for checking purchase completion for a specific product purchased by a purchaser through a partner-company-related application service installed in the smartphone 100-1 to 100-N of the purchaser.

Furthermore, upon receiving the payment-related information and the purchaser information required for the order that are transmitted from the shopping mall server, the partner company server 300-1 to 300-N may transmit a product purchase confirmation message to the smartphone 100-1 to 100-N of the purchaser.

A method of providing a product order service through an electronic transaction using a smartphone according to an embodiment of the present invention will be described in detail below.

Figure 2:
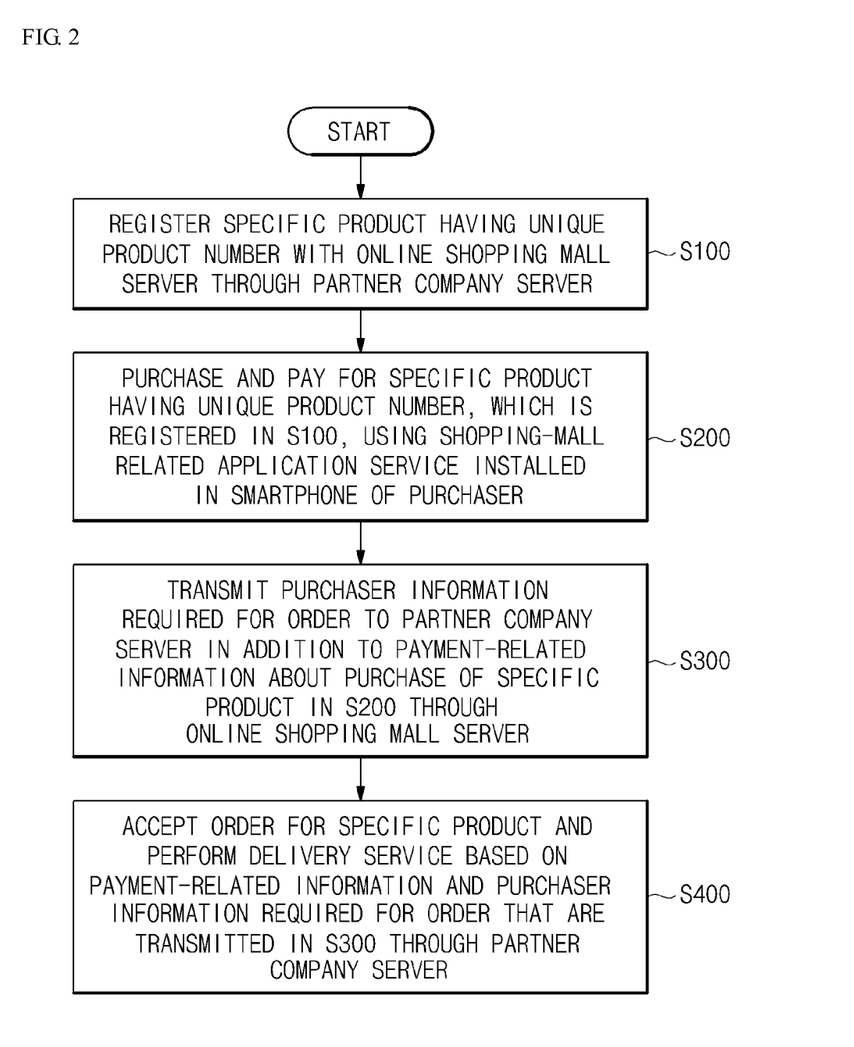
FIG. 2 is a flowchart illustrating a method of providing a product order service through an electronic transaction using a smartphone according to an embodiment of the present invention.

FIG. 2 is a flowchart illustrating a method of providing a product order service through an electronic transaction using a smartphone according to an embodiment of the present invention.

Referring to FIGS. 1 and 2, first, a specific product having a unique product number is registered with the online shopping mall server 200 through the partner company server 300-1 to 300-N (S100).

The unique product number may include at least any one of a partner-company-related application unique number, a product code, an order option code, and a discount information code.

Subsequently, the specific product having the unique product number, which is registered in S100, is purchased and paid for using the shopping-mall-related application service installed in the smartphone 100-1 to 100-N of the purchaser (S200).

Next, purchaser information required for the order is transmitted to the partner company server 300-1 to 300-N in addition to payment-related information about the purchase of the specific product in S200 through the online shopping mall server 200 (S300).

In this case, the purchaser information required for the order may be previously stored in a purchaser information database (DB) 210 of the shopping mall server 200 and may include a delivery destination address, a recipient, and contact information.

Subsequently, the order for the specific product is accepted and a delivery service is performed based on the payment-related information and the purchaser information required for the order that are transmitted in S300 through the partner company server 300-1 to 300-N (S400).

In S400, upon receiving the payment-related information and the purchaser information required for the order that are transmitted in S300, the partner company server 300-1 to 300-N may provide a service for displaying a purchase completion message for checking purchase completion for a specific product purchased by a purchaser through a partner-company-related application service installed in the smartphone 100-1 to 100-N of the purchaser.

Furthermore, in S400, upon receiving the payment-related information and the purchaser information required for the order that are transmitted in S300, the partner company server 300-1 to 300-N may transmit a product purchase confirmation message to the smartphone 100-1 to 100-N of the purchaser.

In S300, the shopping mall server 200 may directly transmit purchaser information required for an order to the partner company server 300-1 to 300-N, but the present invention is not limited thereto. The purchaser information required for an order of a specific product paid for through a shopping-mall-related application service installed in a smartphone 100-1 to 100-N of a purchaser may be automatically entered into a partner-company-related application service installed in the smartphone 100-1 to 100-N of the purchaser and then transmitted to the partner company server 300-1 to 300-N through the partner-company-related application service. A detailed example thereof will be described below in detail with reference to FIG. 3.

Figure 3:
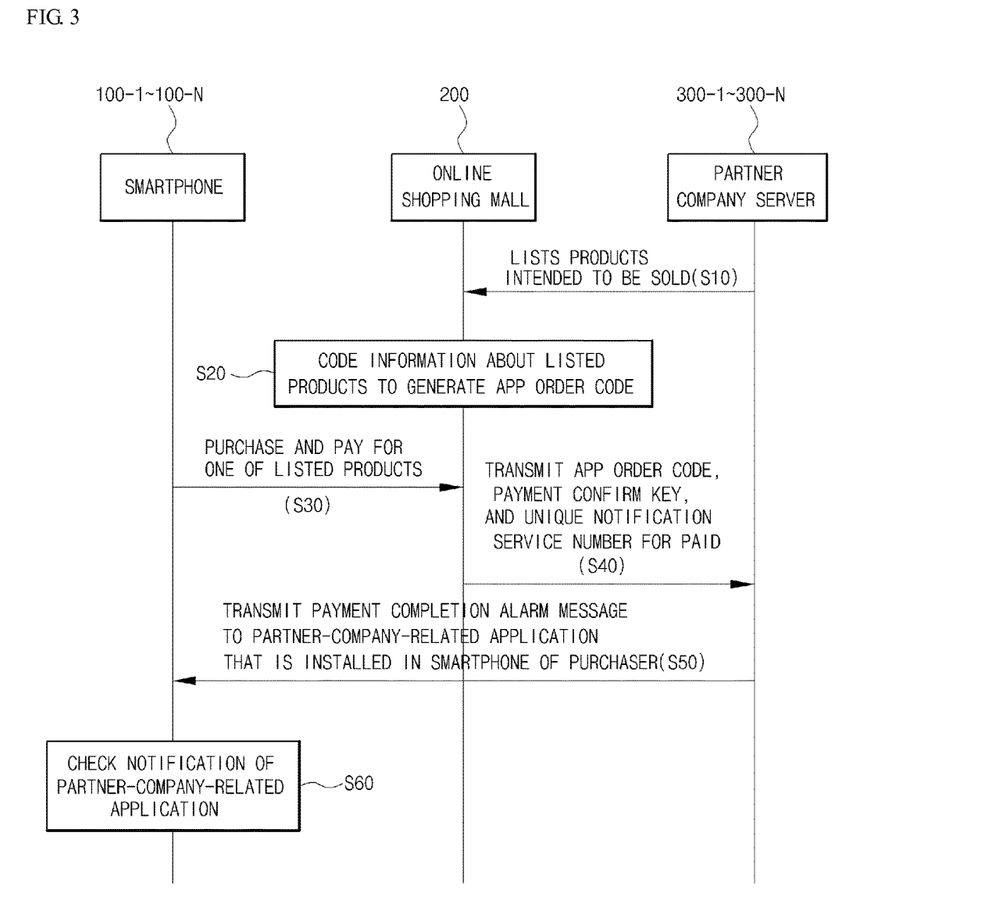
FIG. 3 is a flowchart illustrating overall operations that are performed between a smartphone, an online shopping mall server, and a partner company server to implement the method of providing the product order service through the electronic transaction using the smartphone.

FIG. 3 is a flowchart illustrating overall operations that are performed between a smartphone, an online shopping mall server, and a partner company server to implement the method of providing the product order service through the electronic transaction using the smartphone.

Referring to FIG. 3, first, the partner company server 300-1 to 300-N lists products that he/she intends to sell on the online shopping mall server 200, in which a unique number of a partner-company-related application is also registered (S10).

For example, when Pizza Hut, which is a partner company, lists a discounted pizza menu on Auction, which is an online shopping mall, Pizza Hut may register product information along with a unique number of a Pizza Hut app.

Next, the online shopping mall server 200 codes all information about the products listed in S10 to generate an app order code (S20).

In this case, the app order code may include, for example, an app code (a unique number for the Pizza Hut app), an app product code (a product code in the Auction app), an order option code (optional), and a discount information code (optional).

The purchaser joins the online shopping mall server 200 as a member through the smartphone 100-1 to 100-N and records information (for example, member ID information such as a delivery address, a recipient, and contact information) required for an order. In this case, the information required for the order is stored in the purchaser information DB 210 of the online shopping mall server 200.

Subsequently, the purchaser purchases and pays for a desired product (for example, a Pizza Hut coupon) among products listed in S10 using a service of the shopping-mall-related application (for example, the Auction app) installed in the smartphone 100-1 to 100-N of the purchaser (S30).

In this case, the shopping-mall-related application checks an application list installed in the smartphone 100-1 to 100-N of the purchaser and guides installation of the application when there is no partner-company-related application (for example, the Pizza Hut app). When the partner-company-related application is previously installed in the smartphone 100-1 to 100-N of the purchaser, the purchaser checks a unique notification service number through the shopping-mall-related application service and completes payment.

Next, the online shopping mall server 200 transmits the unique number through a partner company API (S40).

Subsequently, the partner company server 300-1 to 300-N transmits a payment completion message to the partner-company-related application that is installed in the smartphone 100-1 to 100-N of the purchaser (S50).

Next, the purchaser checks the notification of the partner-company-related application installed in the smartphone 100-1 to 100-N of the purchaser (S60). In this case, the partner-company-related application provides an app order code and a payment confirmation key to the shopping-mall-related application, and the shopping-mall-related application provides additional information needed for the partner-company-related application to the partner-company-related application using the purchaser information DB 210 of the online shopping mall server 200 to allow information needed for an order to be automatically input.

For example, when the purchaser purchases and pays for a product at Auction, which is the online shopping mall, using the shopping-mall-related-application service installed in the smartphone 100-1 to 100-N of the purchaser, the online shopping mall server 200 transmits unique notification service information (an app order code and a unique terminal number) to the partner company server 300-1 to 300-N (for example, Pizza Hut's server) and then the partner company server 300-1 to 300-N transmits a product purchase confirm push notification to the smartphone 100-1 to 100-N of the purchaser.

Next, the purchaser executes the partner-company-related-application (for example, the Pizza Hut app) service installed in the smartphone 100-1 to 100-N (or the partner-company-related-application service is automatically executed), checks the purchaser product in the partner-company-related application service using the unique notification service number, selects a button for receiving the product at the Auction delivery destination, confirms information needed for the order, and then pushes an order button. Thus, the order is completed.

That is, the order is completed through the partner-company-related application only by purchasing and paying for the product using the shopping-mall-related application service installed in the smartphone 100-1 to 100-N. That is, the purchase may execute only S30 and then confirm the order details through the partner-company-related application.

Accordingly, the Auction app serving as the shopping-mall-related application may be used as a portal in the smartphone 100-1 to 100-N. For example, it is possible to perform marketing on an app that is not well known, such as a small fashion company, a delivery company for food such as pizza or fried chicken, and a small mart and list products on Auction. In addition, the purchaser may purchase a product through the frequently used Auction app, automatically execute the partner company app, and receive the delivery.

The method of providing a product order service through an electronic transaction using a smartphone according to an embodiment of the present invention can also be implemented as computer-readable codes on a computer-readable recording medium. The computer-readable recording medium is any data storage medium that can store data which can be thereafter read by a computer system.

Examples of the computer-readable recording medium include a read-only memory (ROM), a random-access memory (RAM), a CD-ROM, a magnetic tape, a hard disk, a floppy disk, a mobile storage device, a non-volatile memory (flash memory), and an optical data storage device.

The computer-readable recording medium can also be distributed over computer systems connected through a computer communication network so that the computer-readable code is stored and executed in a distributed fashion.

With the above-described system and method for providing a product order service through an electronic transaction using a smartphone according to an embodiment of the present invention, it is possible to conveniently order an online/offline product through an electronic transaction and also make and distribute a simple app for a small retail shop such as a fried chicken shop, by transmitting purchaser information required for an order to the partner company server in addition to payment-related information about purchase of the specific product or cooperating with a partner-company-related application service.

While the preferred embodiments of the system and method for providing a product order service through an electronic transaction using a smartphone according to an embodiment of the present invention have been described, the present invention is not limited thereto, various modifications may be made therein, and the appended claims are intended to cover all such modifications which may fall within the spirit and scope of the invention.

What is claimed is:

1. A system for providing a product order service through an electronic transaction using a smartphone, the system comprising:
    a smartphone configured to execute a shopping-mall-related application;
    a shopping mall server configured to purchase a specific product having a unique product number that is registered through a partner company; and
    a partner company server configured to register the specific product having the unique product number with the shopping mall server,
    wherein, the smartphone executes the shopping-mall-related application number through the shopping mall server, the shopping mall server transmits purchaser and payment-related information required for an order to the partner company server, the shopping-mall-related application further configured to check an application list installed on the smartphone, initiate installation of a partner-company-related application when the partner-company-related application is not installed on the smartphone, and automatically enter the purchaser information into partner-company related application.

2. The system of claim 1, wherein, upon receiving the payment-related information and the purchaser information required for the order that are transmitted from the shopping mall server, the partner company server displays a purchase completion message for checking purchase completion for a specific product purchased by a purchaser through a partner-company-related application installed in the smartphone.

3. The system of claim 1, wherein the unique product number includes any one of a partner-company-related application unique number, a product code, an order option code, and a discount information code.

4. The system of claim 1, wherein the purchaser information required for the order is previously stored in a purchaser information database (DB) of the shopping mall server and includes a delivery destination address, a recipient, and a contact.

5. The system of claim 1, wherein upon receiving the payment-related information and the purchaser information required for the order that are transmitted from the shopping mall server, the partner company server transmits a product purchase confirmation message to the smartphone.

6. A method of providing a product order service through an electronic transaction using a system including a smartphone connected with a shopping mall server and a partner company server over a communication network, the method comprising steps of:
    (a) registering a specific product having a unique product number with the shopping mall through the partner company server;
    (b) purchasing and paying for the specific product having the unique product number registered in step (a) using a shopping-mall-related application installed in the smartphone;
    (c) checking, in response to the purchasing and by the shopping-mall-related application, an application list installed on the smartphone, initiating installation of a partner-company-related application when the partner-company-related application is not installed on the smartphone, and automatically enter the purchaser information into partner-company related application;
    (d) transmitting payment-related information about the specific product purchased in step (b) and purchaser information required for an order to the partner company server through the shopping mall server.

7. The method of claim 6, further comprising step (e), upon receiving the payment-related information and the purchaser information required for the order that are transmitted in step (d), the partner company server displays a purchase completion message for checking purchase completion for a specific product purchased by the purchaser through the partner-company-related application service installed in the smartphone.

8. The method of claim 6, wherein, in step (a), the unique product number includes any one of a partner-company-related application unique number, a product code, an order option code, and a discount information code.

9. The method of claim 6, wherein, in step (d), the purchaser information required for the order is previously stored in a purchaser information database (DB) of the shopping mall server and includes a delivery destination address, a recipient, and a contact.

10. The method of claim 6, further comprising step (e), upon receiving the payment-related information and the purchaser information required for the order that are transmitted in step (d), the partner company server transmits a product purchase confirmation message to the smartphone.

* * * * *

UNITED STATES PATENT AND TRADEMARK OFFICE
CERTIFICATE OF CORRECTION

| | | |
|---|---|---|
| PATENT NO. | : 9,830,639 B2 | Page 1 of 1 |
| APPLICATION NO. | : 14/549606 | |
| DATED | : November 28, 2017 | |
| INVENTOR(S) | : Phil Jae Kim | |

It is certified that error appears in the above-identified patent and that said Letters Patent is hereby corrected as shown below:

In the Claims

In Column 13, Line 33, in Claim 1, after "application" insert -- configured to initiate the purchase of the specific product having a unique product --.

In Column 13, Line 34, in Claim 1, delete "mail" and insert -- mall --, therefor.

Signed and Sealed this
Eighth Day of May, 2018

Andrei Iancu
*Director of the United States Patent and Trademark Office*